July 6, 1926.
A. R. VILA
1,591,583
METHOD AND APPARATUS FOR EVAPORATION AND COOKING OF SUGAR JUICES
Filed Jan. 28, 1925    5 Sheets-Sheet 1
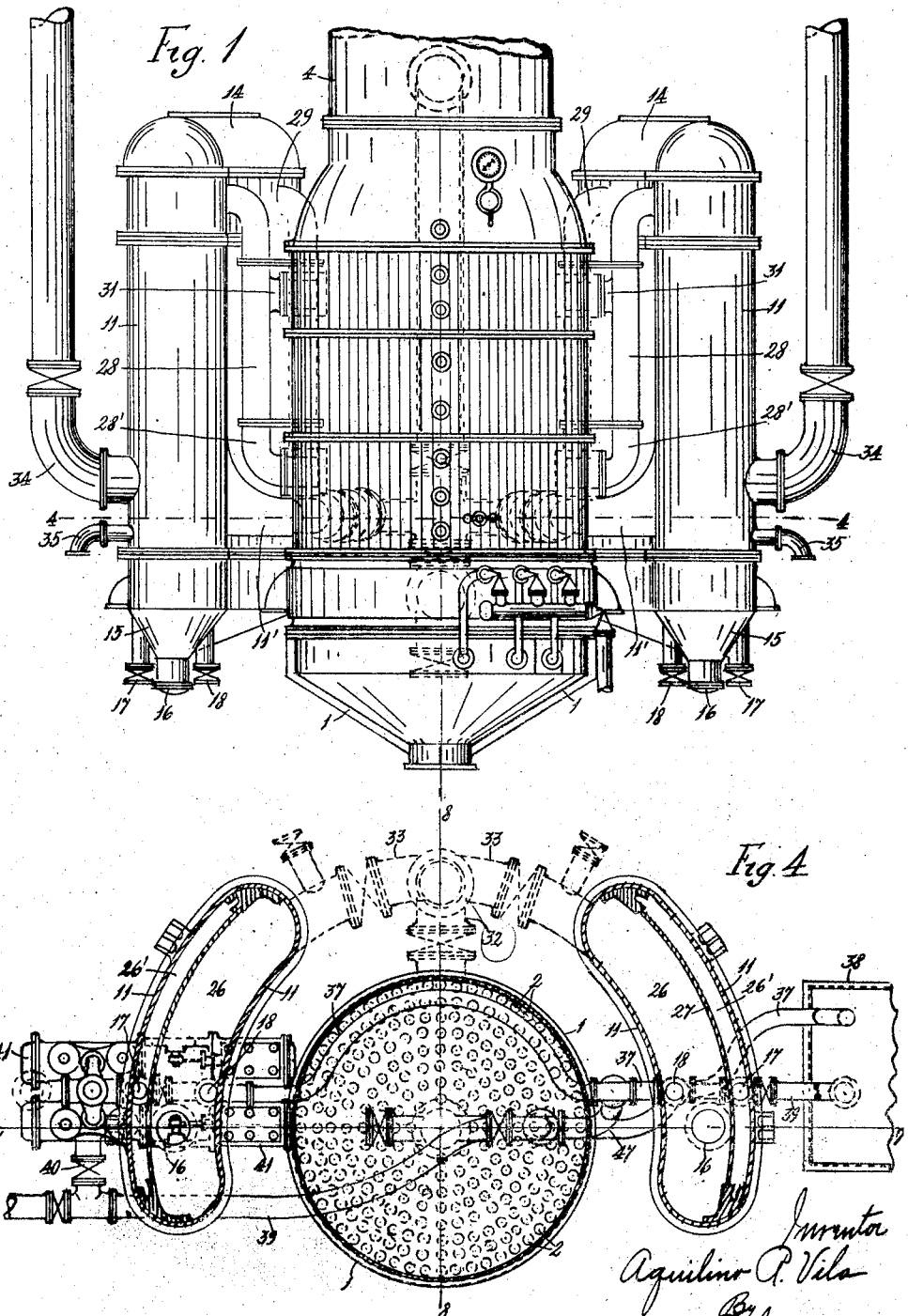

July 6, 1926.  1,591,583
A. R. VILA
METHOD AND APPARATUS FOR EVAPORATION AND COOKING OF SUGAR JUICES
Filed Jan. 28, 1925  5 Sheets-Sheet 2
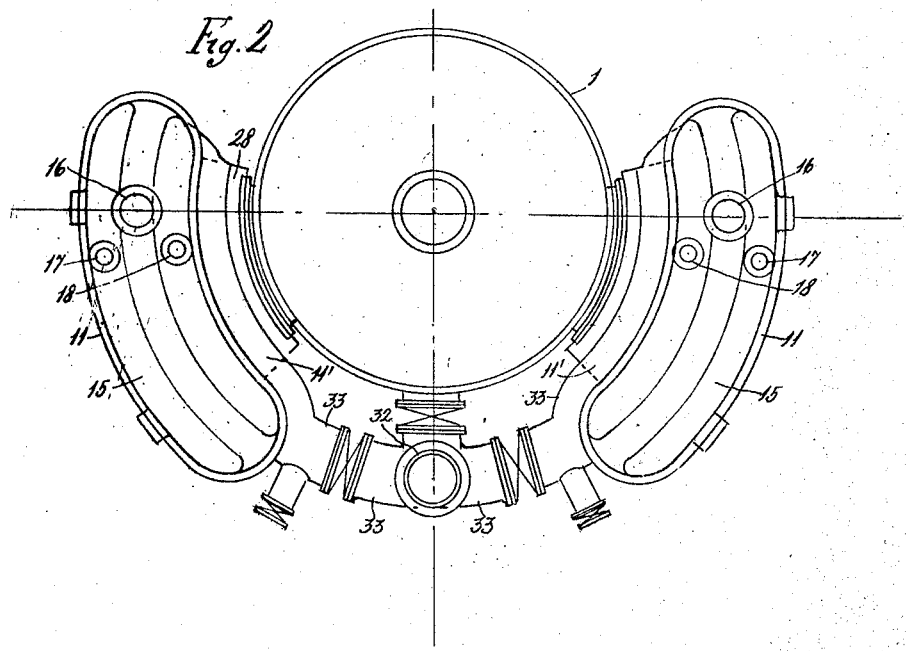
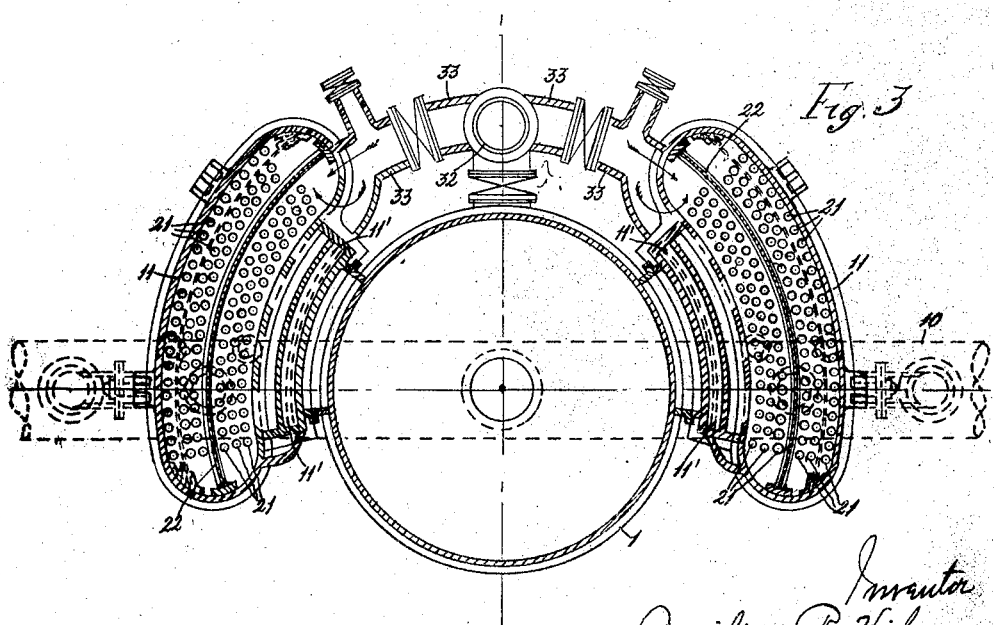
Inventor
Aquilino R. Vila
By
B. Singer, Atty.

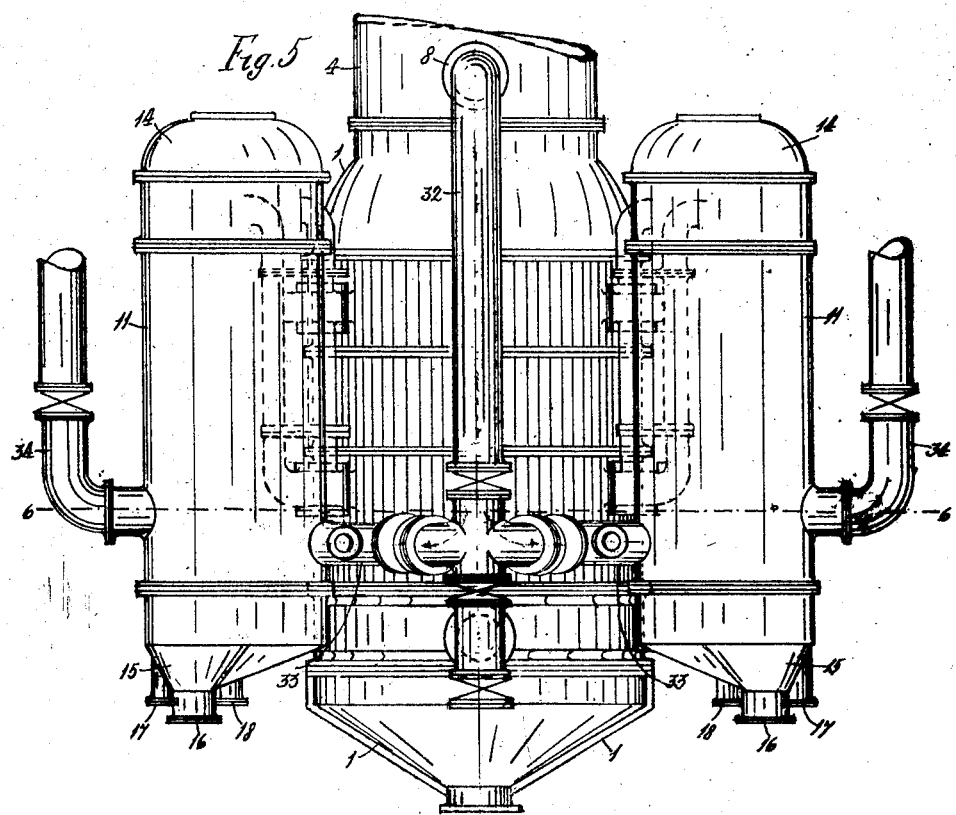
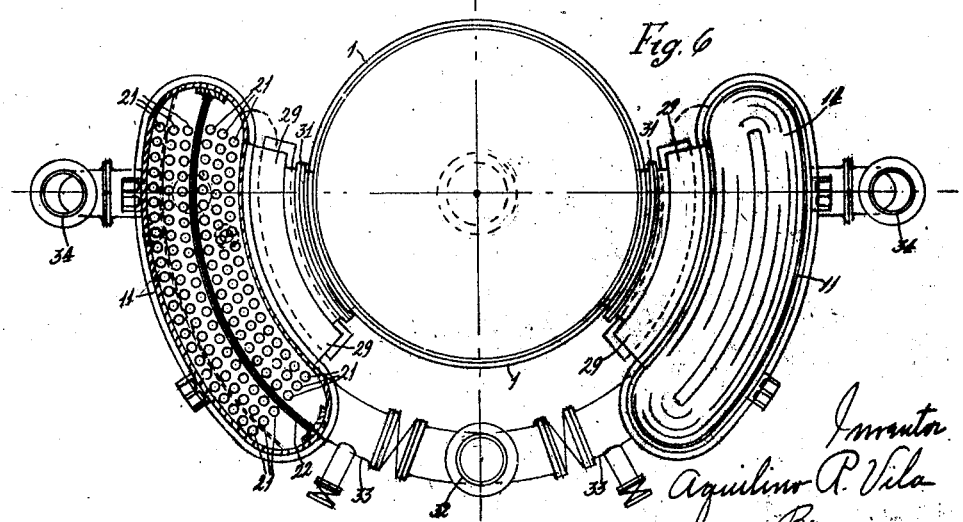

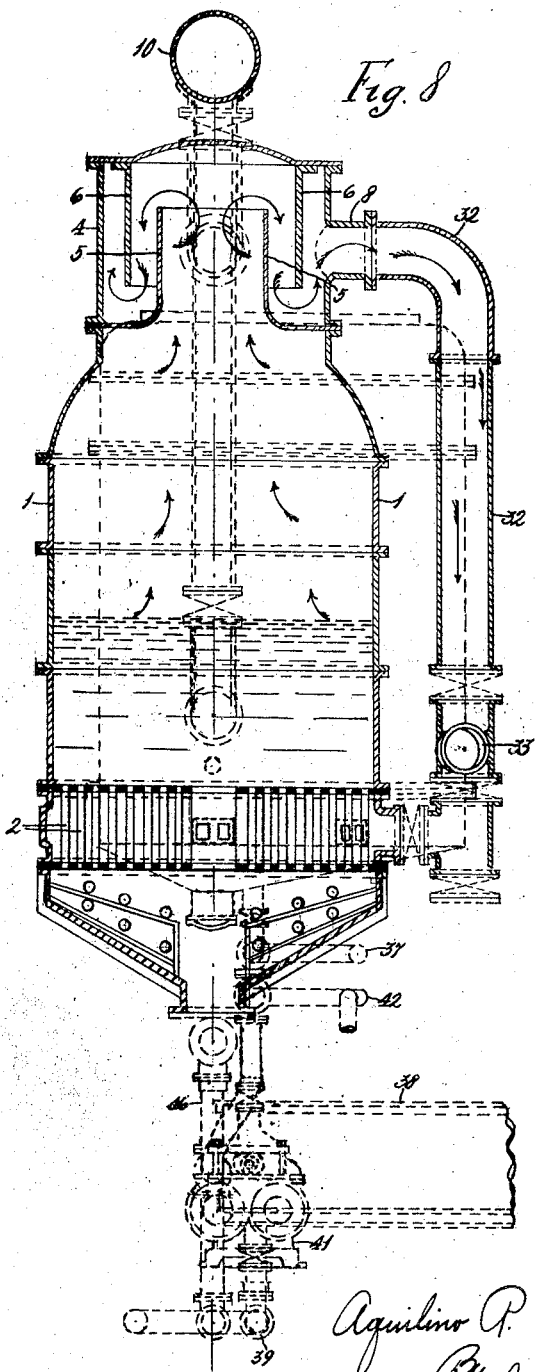

Patented July 6, 1926.

1,591,583

UNITED STATES PATENT OFFICE.

AQUILINO R. VILA, OF HABANA, CUBA.

METHOD AND APPARATUS FOR EVAPORATION AND COOKING OF SUGAR JUICES.

Application filed January 28, 1925, Serial No. 5,303, and in Cuba January 13, 1925.

This invention relates to improvements in methods and apparatus for the evaporation and cooking or granulation of sugar juices, and its main object is to unify in a single operation the various operations of evaporating and cooking or granulating the sugar juice, which operations have heretofore been effected in different vacuum apparatus, the evaporation, in multiple effect evaporators, and the cooking or granulation in vacuum pans.

Another object is to increase the surface of evaporation of the vacuum pans designed for the cooking or granulation of the sugar, by adding thereto special evaporating bodies, whereby each vacuum pan is transformed into an evaporating and granulating apparatus which operates independently in connection with the high vacuum condenser, thus improving the operating system at present in use of grouped evaporating pans forming low vacuum multiple effects.

Another improvement consists in causing the sugar juices and the granulated and cooked mass to circulate inside the same pan, to effect at the same time the evaporation and the cooking or granulation of the sugar juices, in a methodical manner by using the heat of the vapors generated by the proper juices in the same pan, that is, causing the hotter vapors to transmit their heat to the hotter juices and the cooler vapors to transmit their heat to the cooler juices, thereby effecting an important economy or saving in fuel.

Another object is to insure the continued cleansing of the vacuum pans by the continued circulation of the cooked mass, without letting it rest on any part of the pan.

Another object is to obtain a greater yield in the extraction of sugar from the cane or other vegetable products, by increasing the quantity of water used in the maceration or imbibition of the bagasse in the mills for exhausting or reducing as much as possible the amount of sugar in the the bagasse.

The invention is described with reference to the figures of the annexed drawings, in which:

Fig. 1 is a front view of an evaporating and cooking or granulating pan, constructed in accordance with this invention.

Fig. 2 is a lower plan view thereof.

Fig. 3 is a horizontal section on line 4—4 of Fig. 1.

Fig. 4 is a horizontal section on line 3—3 of Fig. 1.

Fig. 5 is a rear elevation of the same pan.

Fig. 6 is a horizontal section of the same on line 6—6 of Fig. 5.

Figure 7:
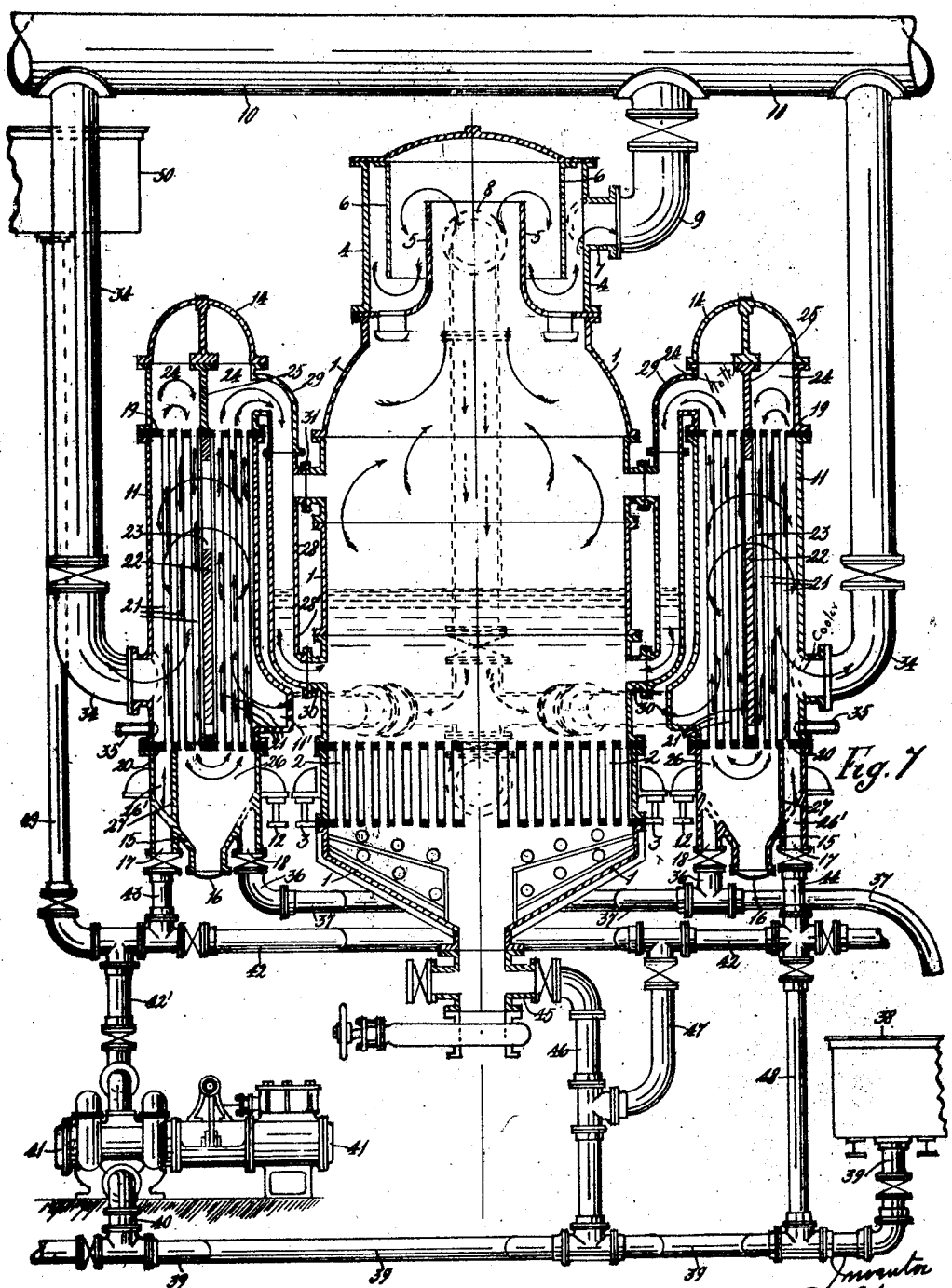
Fig. 7 is a vertical section of the apparatus on line 7—7 of Fig. 4.

And Fig. 8 is a cross vertical section of the apparatus on line 8—8 of Fig. 4.

This invention consists in effecting the evaporation and cooking or granulation of the sugar juices in the same vacuum pan, by adding to the same additional exterior bodies between which and the body of the pan is effected a forced circulation of the juices treated, causing also the vapors to circulate from the evaporation in the same pan through such additional outer bodies, before passing to the vacuum condenser, so as to transmit its heat to the treated juices. In a preferred manner, such additional exterior bodies, are of tubular structure, so that the juices treated in the pan may circulate through the interior of the tubes, and the vapors of the pan may circulate on the exterior of the tubes, so that the hotter vapors may come in contact with the tubes through which the hotter juices pass and so that the cooler vapors may come in contact with the tubes through which the cooler liquids pass whereupon the vapors are led to the vacuum condenser.

In the drawings, 1 indicates the main body of a vacuum pan provided at its lower portion with the mangle or heater body having vertical tubes 2 between which tubes the exhaust vapor of the steam engines is supplied, as is usual, said pan being supported on outer horizontal beams 3 which are supported on columns, not shown. The dome of the pan has at its interior a vertical neck 5 through which pass the vapors of the pan and which is surrounded at a certain distance by a bell 6 fixed to the upper part and concentric with the neck 5 and also spaced apart from the outer vertical wall of the dome, in which are formed horizontal outlets 7 and 8, of which the first is connected with a tube 9 which leads to the collecting tube 10′ leading to the vacuum condenser.

At the exterior of pan 1 are annexed thereto a plurality of cylindrical vertical bodies 11 which in horizontal section are of kidney shape, there being illustrated in the drawings two of these bodies, one at each side of the pan, each body 11 being fixed on horizontal beams 12 which are supported on columns not here shown. Each additional body 11 is closed on the top by a semi-cylindrical cap 14 and at its lower part is provided with a bottom 15 of reduced section which is provided with three openings 16, 17 and 18. The vertical body 11 is divided lengthwise by two false bottoms, an upper one 19 and a lower one 20 which consists of horizontal plates provided with perforations in which are mandrelled and fixed a plurality of vertical tubes 21 arranged in rows concentric with pan 1 and which for the purpose of this invention are divided in two groups of three rows each by a vertical curved wall 22 at whose upper part is formed a large opening 23 for passing the vapors from one to the other side of said wall 22. Above the upper tube-carrying plate 19 is formed a chamber 24 for the vapors which chamber is divided in two parts by a vertical wall 25 which coincides vertically with the wall 22. Below the lower tube-carrying plate 20 is formed another vapor chamber which is divided in two parts 26 and 26' by a curved vertical wall 27 which corresponds vertically with the intermediate space between the first two rows of tubes 21 counted from the exterior. The inner opening 17 corresponds vertically with the narrow chamber 26' thus formed. Each evaporating body 11 is connected with the body 1 of the pan by means of a vertical tubular duct 28 of elongated horizontal section, which is arranged in the space between each evaporator 11 and the body 1 of the pan and is connected with an elbowed mouth piece 29 which forms part of the inner side wall of chamber 24, and said duct is terminated at its lower end in an elbowed section 28' which is connected to a mouth piece 30 of elongated section formed horizontally at the side of the body 1 of the pan, there being also tubular union of elongated section 31 between the body of pan 1 and the upper part of duct 28.

From the outlet 8 provided at the side wall of dome 4 a tube 32 leads downward which is bifurcated to form two horizontal tubes 33 ending in side chambers 11' formed at the lower part of the section of the two evaporating bodies 11 in which is arranged the group of vertical tubes 21 which are near the pan 1. The vertical tube 32 is provided with a valve which is diagrammatically indicated by means of two crossed lines, and each of the horizontal tubes 33 is provided with a valve.

From an outlet formed at the lower part of the section of each evaporating body 11 in which are arranged tubes 21 which are spaced somewhat from pan 1, leads a tube 34 provided with a valve and which communicates with the collecting tube 10 leading to the vacuum. Each evaporating body 11 is also provided above the lower tube-carrying plate 20 with a discharge tube 35 for the steam condensation.

The discharge outlet 18 of each evaporator 11 communicates, by means of a tubular union 36 provided with a valve, with a horizontal tube 37 which runs around the bottom of pan 1 and serves for discharging the contents of said evaporating bodies 11 into a tank 38, from the bottom of which leads a tube provided with a valve 39 and which is connected through a tubular union 40 with a pump 41. Said pump communicates through a tube 42' with another horizontal tube 42, which is connected through tubular unions 43 and 44 to the outlets 17 of the bottom of the evaporating bodies 11. From the discharge outlet of pan 1 leads, in turn, by means of a tubular union 45 provided with a valve, a tube 46 which communicates with the tube 39 which supplies the pump 41, tubes 42 and 46, being connected together by another tube 47 provided with a valve, the function of which is to draw acid water used for washing the evaporators 11 without passing the same through the vacuum pan and pump. From the cross union of tube 42 within tubular union 44 leads another tube 48 provided with a valve and communicating with tube 39 which supplies the pump 41. From the tube 42 and beyond the point of communication with the pump 41, leads a tube 49 which serves for elevating the juices to a tank 50 for depositing the juices when so desired.

Having thus described the structure of the apparatus, the operation of evaporating and cooking or granulating at the same time, is as follows. The sugar juices already defecated, which in the present process of elaboration of sugar are passed to the evaporating apparatus of multiple effect, are passed directly to the vacuum pan 1 in which they are subjected to the heat afforded by the exhaust vapor of the steam engines, which vapor is fed as usual to the steam space of the heater body 2. As soon as the heating of the pan starts the valve of tube 9 is closed, and the valves of the vertical tube 32 and the two horizontal tubes 33 in which the first one is bifurcated, are opened. Thus, the vapors produced by the evaporation of the juices in the body of pan 1, pass through said tubes 32 and 33 into the chamber 11' of each additional evaporating body in which is arranged the group of tubes 21 nearer to pan 1, the vapors thus entirely washing these tubes 21 and from the chamber 11 the vapors pass through opening 23 in the vertical wall 22, and pressing them downwardly wash the three rows of vertical tubes 21 forming the group farther away from pan 1, from which they pass through tube 34 to the collecting tube 10 which carry them to the vacuum condenser. At the same time that this takes place, the juices treated inside the pan 1 are given a forced circulation through the pan 1 and through the additional evaporating bodies 11, by operating the pump 41, and such circulation being established, the pump 41 takes the juices of the pan from the bottom outlet and tubes 46 and 39, to which effect the valve of the tubular union 45 is opened and the valve of tube 47 is closed, thereby the juices being thrown by the pump 41 into tube 42 which through the tubular unions 43 and 44 introduce the juices in the section of chamber 26' of each evaporating body 11 in which tubes 21 forming the vertical row farther away from pan 1 are opened. Thus the juices are elevated inside said tubes 21 of the outer row to the outer half of the upper chamber 24 in which also the tubes 21 which form the other two immediate vertical rows arranged closer to pan 1 are opened. Thus the juices elevated to chamber 24, come down through the tubes 21 of said other two rows to the lower chamber 26 of each evaporating body 11, from which they are elevated through the interior of tubes 21 forming the group of three vertical rows arranged at the other side of the vertical wall 22, to the other half of the upper chamber 24, from whence the juices come down by the vertical duct 28 of elongated horizontal section and pass again to the interior of pan 1 by the upper and lower unions 31 and 30 respectively, this circulation being repeated continuously. As will be observed, the juices coming from the pan 1, pass first into the evaporating bodies 11, through and inside the vertical tubes 21 inclosed in the section of chamber 11 farthest from pan 1 and which are washed by the vapors from the same pan 1 which already have circulated through section of chamber 11 which is nearest to the pan 1, said vapors being therefore named the cooler vapors and in a similar manner, the hotter juices, that is, those which have absorbed the heat transmitted to the rows of vertical tubes 21 inclosed in the section of chamber 11 which is farthest from pan 1, pass then through inside the rows of vertical tubes 21 which are arranged nearer the pan 1 and which are the ones which receive first the contact of the vapors from pan 1, that is, the hotter vapors. Thus is effected a methodical use of the heat carried by the vapors from the evaporation of the juices in the same pan and which in the process heretofore in use are directly carried to the vacuum condenser for its condensation.

By means of this apparatus it is possible to effect the evaporation of the juices followed directly by the concentration or granulation of the same to the crystallizing point, forming what is called the "cooked mass" in the vacuum pans, with the advantage of enabling the multiple effect apparatus to be dispensed with.

Once the cooked mass reaches the desired coction point, the whole of the mass is discharged into the crystallizers, as in the process heretofore in use. The discharge of the mass is effected through the lower part of pan 1, by properly closing the valves which regulate the travel of the juices and the cooked mass through the evaporating bodies 11.

The discharge of the contents of the evaporating bodies 11 is effected through the outlet 18 of the same, by means of a tube 37 which carries the contents to tank 38 for its further use, by opening conveniently the valves of the tubular unions 36.

By means of this invention the evaporation which ordinarily is carried out in a multiple effect apparatus, and the coction or granulation of the juices to the desired density for the crystallization of the sugar are carried out in a sole pan. And the great evaporative capacity of a pan constructed in accordance with this invention will be obvious when it is considered that the heating surface of each additional evaporating body 11 is a number of times greater than the heating surface afforded by the usual heating body of a vacuum pan, owing to the fact that the vertical tubes 21 of the evaporating bodies 11 have a length which is three or four times the length of the tubes of the heating body 2 of pan 1 or any vacuum pan, in view of which it is possible to evaporate by means of this new apparatus larger quantities of water that might be diluted in the sugar juices, and particularly so when use is made of the heat carried by the vapors produced in the evaporation of the juices in the same pan, in the manner described, that is, by causing the juices to circulate continuously from the body of the pan to the additional evaporating bodies, and by causing the vapors produced in the same pan to circulate in reverse direction to the juices.

This invention permits such an increase in the quantity of water used in the maceration or imbibition of the bagasse during its travel through the mills before being carried to the furnaces where it is used as fuel, as to take from the bagasse a quantity of sugar which otherwise would be lost, and which by the imbibition methods heretofore in use was not possible, and without an excess of fuel expense.

It should be understood that my invention is not limited to the form of apparatus described and illustrated in the drawings, but to the unification of the operations of evaporation and coction or granulation of the juices in a single operation, whatever be the form of apparatus used, within the scope of the appended claims.

What I claim is:—

1. A method of carrying out together the evaporation and the coction or granulation of the sugar juices, which consists in carrying the defecated juices, without being passed through a multiple effect evaporating system, to a sole vacuum pan provided with an additional evaporating body, establishing a forced circulation of the juices from the pan to the additional evaporating body and vice versa, and effecting the heating of the juices which circulate through the additional evaporating body by the vapors from the juices in the same pan, until a mass cooked to the proper point for the crystallization of the sugar is obtained therein.

2. A method of carrying out together the evaporation and the coction or granulation of the sugar juices, which consists in carrying the defecated juices, without being passed through a multiple effect evaporating system, to a sole vacuum pan provided with an additional tube evaporating body, establishing a forced circulation of the juices from the pan to the interior of the tubes forming the additional evaporating body and vice versa, and effecting the heating of the juices which circulate through the tubes forming the additional evaporating body by the circulation around these tubes of the vapors produced in the pan, until obtaining a mass cooked to the proper point for its crystallization.

3. An apparatus of the class described, comprising in combination with a vacuum pan, an outer evaporating body laterally connected to the liquid and vapor spaces of the pan and comprising a bunch of vertical tubes spaced apart and arranged in rows and two horizontal plates, the central chamber thereby formed between the plates being divided in two sections by a central vertical wall provided with an opening at its upper half, means for forcing the liquid delivered at the bottom of the pan first through the row of tubes of the evaporating body which are farther from the pan and then through the other tubes nearer the pan, and means for circulating the vapors delivered at the top of the pan, through the space surrounding the tubes of the evaporating body, viz first through the section of the chamber containing the tubes which is nearer to the pan then through the other section of the same chamber which is farther from the pan and always in reverse direction to that of the circulation of the liquid through the interior of the tubes of the evaporating body.

In witness whereof I affix my signature.

AQUILINO R. VILA.